United States Patent [19]

O'Shima

[11] 3,917,498

[45] Nov. 4, 1975

[54] METHOD OF PRODUCING PLASTIC RESIN LAWN-LIKE OBJECTS

[76] Inventor: Yasuhiro O'Shima, c/o Meiwa Gravure Chemical Co., Ltd. 860, Osaka, Osaka Prefecture, Japan

[22] Filed: July 20, 1973

[21] Appl. No.: 381,030

[30] Foreign Application Priority Data

Aug. 2, 1972  Japan.............................. 47-77780

[52] U.S. Cl. ................ 156/204; 156/250; 156/269; 156/271; 156/324; 156/245; 264/167; 270/86
[51] Int. Cl. .............................................. B29c 5/00
[58] Field of Search .......... 156/242, 244, 245, 324, 156/204, 250, 269, 271; 161/21, 62, 63, 64, 67; 264/167, 216, 219; 270/61 R, 68 R, 68 A, 86

[56] References Cited
UNITED STATES PATENTS

| | | | |
|---|---|---|---|
| 2,222,539 | 11/1940 | Meston | 161/64 |
| 2,956,799 | 10/1960 | Wasson | 270/86 |
| 3,442,504 | 5/1969 | Halley | 270/86 |
| 3,576,698 | 4/1971 | Chidgey et al. | 161/21 |
| 3,616,104 | 10/1971 | Icuzmick | 161/21 |
| 3,729,364 | 4/1973 | Doleman et al. | 161/21 |

*Primary Examiner*—Charles E. Van Horn
*Assistant Examiner*—Caleb Weston
*Attorney, Agent, or Firm*—Toren, McGeady and Stanger

[57] ABSTRACT

A method of easily and economically mass-producing plastic lawn-like objects exactly like natural lawn, any other grass similar thereto, or the man created imitations thereof is disclosed. The method involves forming molding plates respectively having a surface continuously engraved with the design of one side of natural lawn or the like.

The method further involves filling a plastic resin in this engraved surface, hardening the same to mold lawn-like objects constituting elements, and arranging a plurality of these paralleled elements so as to be stuck inseparably to a ground sheet thereby providing thermal plastic lawn-like objects superior in quality to conventional ones.

2 Claims, 8 Drawing Figures

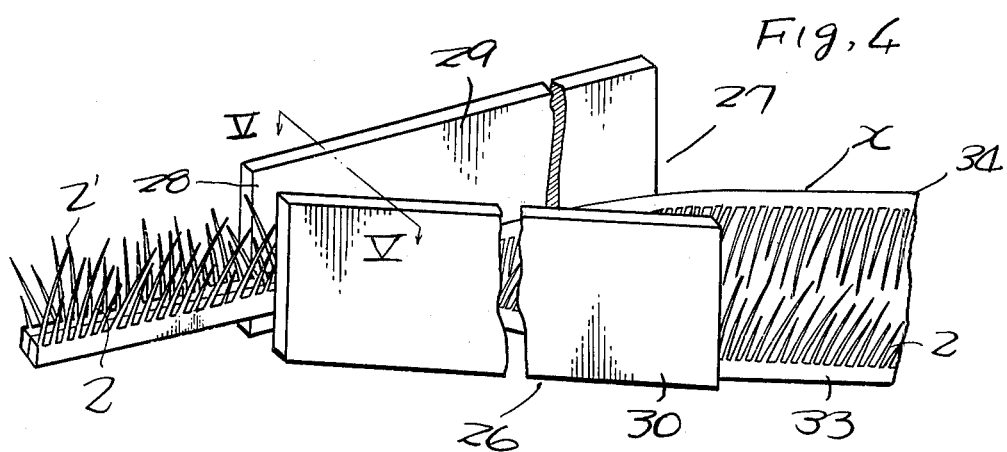
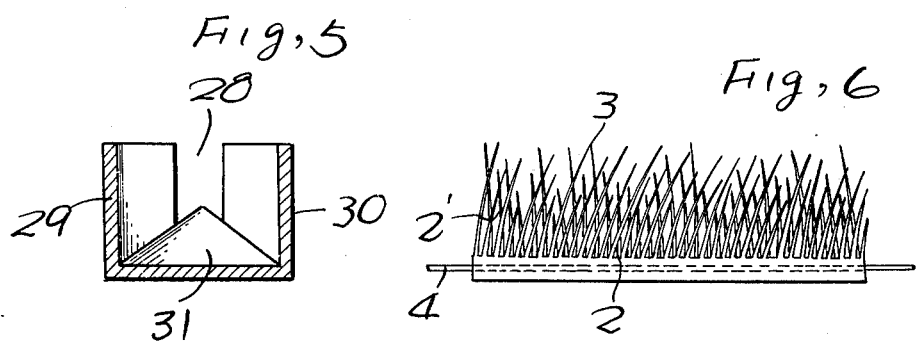
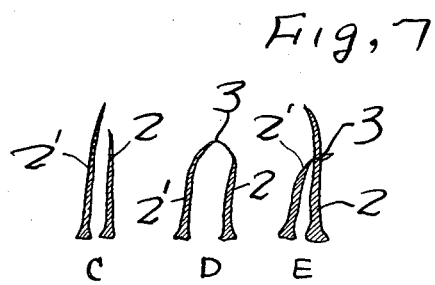
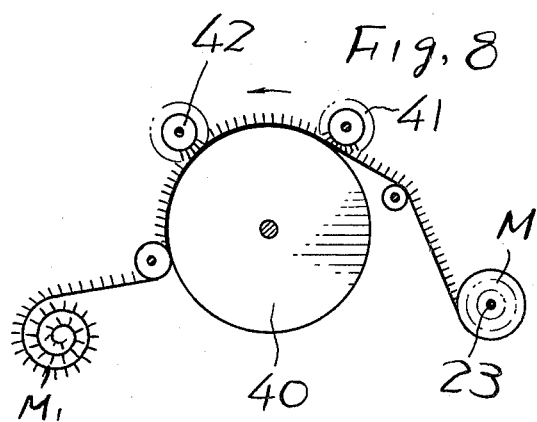

3,917,498

METHOD OF PRODUCING PLASTIC RESIN LAWN-LIKE OBJECTS

The present invention relates to an improved method of producing artificial lawn-like objects or the like of synthetic resin material and more particularly it relates to a method of mass-producing such products that are superior in quality and low in cost.

It is one of the main objects of the invention to provide an improved method of producing such synthetic resin lawn-like objects or the like. It is another object to provide a method of continuously producing a plurality of synthetic resin lawn-like objects or the like having a design on one side of similar natural lawn or the like by forming a plurality of flat molding plates or rotary cylinders respectively having a surface continuously engraved with a preferred design having the exact same outer appearance as that of one side of natural lawn or the like; a plastic resin filled in the engraved portion of said surface, thereafter solidifying the plastic as it remains filled therein. It is a further object to provide a method of economically mass-producing the products in which each constituent element of the plastic resin lawn-like objects or the like is integrated to a ground base or backing sheet.

It is another object to provide a method of folding each constituent element so as to put the above mentioned design outside thereof and disposing a plurality of these folded constituent elements to present a continuity of the designs from a front and a rear view of the product and also a slightly curved parts of designs from a side view thereof.

Referring to the conventional method for producing artificial lawn-like objects or the like of thermal plastic resin material, it is customary to weave either synthetic resin split yarns or monofilaments, in place of twisted yarns, as by means of a carpet weaving machine, to form the constituent elements of lawn-like objects by using an injection molding machine or otherwise to mold the same under pressure produced by a pressure molding machine. However, the artificial lawn-like objects produced in any of these method are commonly so devoid of a resemblance in appearance to natural lawn or the like that they are seen to be a merely man-created imitation, resulting in decreased consumer interest. What is worse, the manufacturing process is extremely complicated and very low in productivity giving rise to a prohibited cost of the products.

The present invention provides an improvement of the method of the U.S. Pat. application Ser. No. 101,480 filed on Dec. 28, 1970, now U.S. Pat. No. 3,759,769.

The present invention provides a method of economically mass-producing the products to more closely resembles natural lawn or the like.

The present invention has succeeded in eliminating the above mentioned drawbacks and disadvantages of the prior arts by using flat or cylindric molding plates respectively having a surface continuously engraved with a preferred design identical to the outer appearance of natural lawn, any other smaller grass or the man-created imitations thereof, that is, the design comprises a plurality of blades of grass having varying lengths and depths and on one side thereof the rough outside surface of natural grass and on another side thereof corresponding to the outside surface of the plate a substantially flat surface, a groove designed to serve as a base to interconnect said blades of grass therein, which is disposed double in parallel lines at a spaced apart interval having twice an average length of the blades of grass which are substantially slightly inclined in relation to a line at right angles to the groove respectively, and a portion of the blades of grass being connected each other at tips or other portions thereof, and further more by using a particular method described hereinafter.

The details of the invention are as described by reference to the accompanying drawings and in which;

FIG. 4 is a perspective view showing guide plates.

FIG. 5 is a cross-sectional view taken on V—V line of FIG. 4.

FIG. 6 is a side elevation of a plurality of constituent elements (wherein a string is shown as being substantially a little more extended than real, said string being fit as described hereinafter)

FIG. 7 is a vertical section view of a design of blades of grass at each portion with a groove for a base broken away.

FIG. 8 is a schematic diagram explaining a cutting device for cutting connected portions of the artificial lawn-like products.

Figure 1:
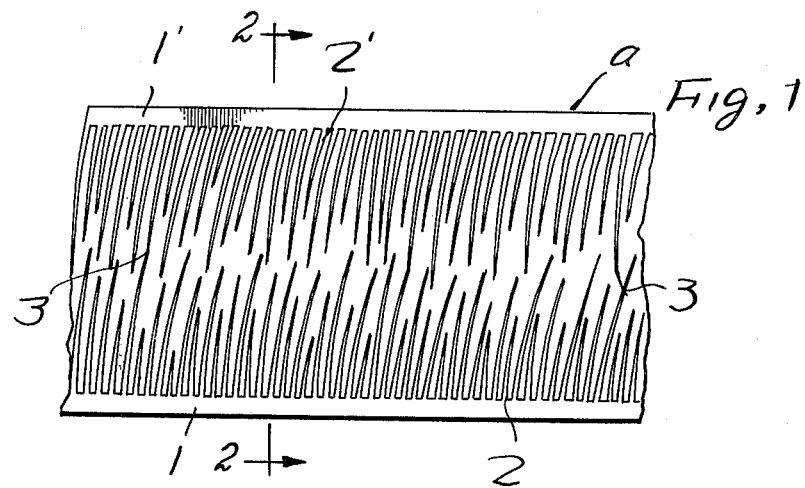
FIG. 1 is a plan view partially showing one of the flat molding plates respectively having an engraved surface comprising a design appearing the same as one side of natural lawn, a groove designed to serve as a base to interconnect said design, and a portion of said design connected at a tip or other portion.
Figure 2:
FIG. 2 is a vertical section view taken along line II-II in FIG. 1.

In FIG. 1, reference character a designates a plan view showing a development of a cylindric metallic plate wherein two grooves 1 and 1' are engraved linearly in parallel at a spaced apart interval corresponding to about double the average length of blades of grass and preferred designs 2 having varying lengths and depths inclining slightly rightwards to the direction perpendicular to the base groove 1 are continuously engraved between the base groove 1 and nearly the middle of the interval of the groove 1 and 1'. Similarly, the designs of blades of grass corresponding to the above mentioned, slightly inclining leftwards are engraved in the same manner and the designs 2 and 2' are interconnected as at 3 at tips and other selected portions thereof, wherein it is preferable that they be interconnected in a range of about 15 to 20 percent of the designs on the surface of the plate.

Further, on the surface of the cylindric metallic plate having about 93 cm in width 25 parallel lines of grooves 1 and 1' provided with the designs 2 and 2' of blades of grass are engraved.

While preparing thermoplastic synthetic resin, for example, polyvinyl chloride resin paste colored similarly to natural grass, the paste is filled into the engraved designs 2 and 2', grooves 1 and 1' and the interconnections 3, symultaneously, a strong strand or the like 4 of a thermoplastic synthetic resin monofilament or a synthetic fibre is inserted into the groove 1 and 1' respectively.

After being filled into the surface of cylinderic metallic plate as aforegoing mentioned, the paste is gelled by heating the plate (a) and thereafter is removed from the cylinderic metallic plate (a) to be rolled up by a winder.

This product is a constituent element x.

In the case that conventional thermoplastic synthetic resin paste is substituted for the above-mentioned thermoplastic synthetic resin paste, a molten mass of the former is extruded from an extruder into the engraved surface of said cylinderic metallic plate a and after surplus quantity thereof has been removed it is cooled off in a method described hereinafter, thus the object corresponding to the constitutional element is obtainable. In the case of using the thermoplastic synthetic resin of general type, it is preferable to use such a resin paste for example as a polyethylene resin, a vinyl acetate polyethylene resin, a polypropylene resin or the like.

The constituent element x obtained with the above-mentioned method is composed of a plurality of a slightly rightwards inclined lawn-like objects integrated to the linear base 33 made of said gelatinized paste filled in the groove 1, a plurality of a slightly leftwardly inclined lawn-like objects integrated to the linear base 34 made of gelatinized paste filled in the groove 1', and a plurality of said lawn-like objects of about 15 to 20% connected with each other at tips or other portions.

Figure 3:
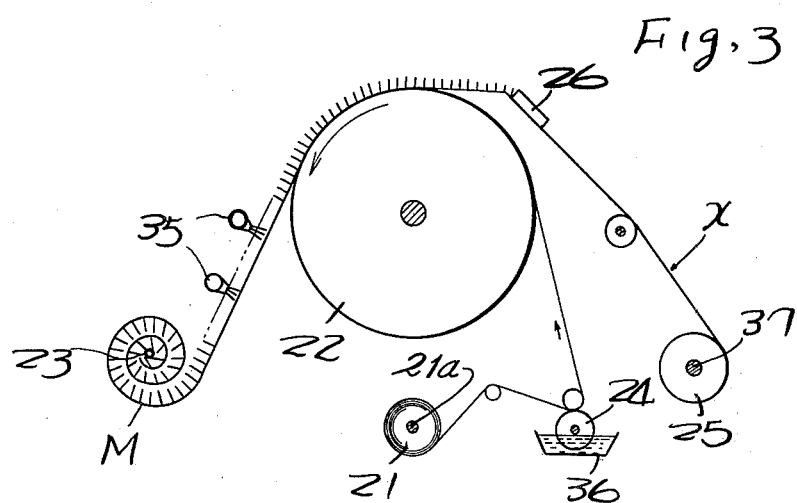
FIG. 3 is a schematic diagram explaining an example showing a particular device to be used for sticking a plurality of constituent elements inseparably to a ground sheet.

The constituent element x formed with aforegoing method is securely stuck onto the base sheet with a sticking means shown in FIG. 3.

The sticking means is illustrated in FIG. 3 as follows:

In FIG. 3, reference numeral 21 designates a ground sheet comprising stuck films of thermoplastic synthetic resin such as polyvinyl chloride resin or a mesh-netting cloth, wire netting and the like, which is rolled upon a shaft 21a supported by a suitable means and rolled out therefrom. The ground sheet 21 is rolled out to be conveyed forwardly in the direction of the arrow in FIG. 3 through the peripheral surface of a rotatably mounted cylindric heater 22, and while passing thereon it is heated to be dried and thereafter rolled up by a winder 23 mounted at the rear of the heater 22, where the ground sheet 21 is supplied through a roll coater 24 rotatably mounted near the rotatable cylinderic heater 22 soon after it is rolled out from the shaft 21a. Thus by means of the roll coater 24 the binding agent or plastic resin paste, e.g., polyvinyl chloride resin paste is applied all over one surface of the supplied ground sheet 21, wherein the roll coater 24 is rotatably partially dipped into said polyvinyl chloride resin paste filled within a store tank to coat while rolling said polyvinyl resin paste on one side of the ground sheet 21.

Designated at reference numeral 25 is unfinished products or lawn-like object constituent elements rolled up by a shaft 37 supported by a suitable means and it is rolled out from the shaft 37.

The unfinished products 25 rolled out from the shaft 37 are folded back to back with a guide means 26 mounted near an upper surface of the cylindric heater 22 so that lawn-like objects 2 and 2' of the constituent elements x appear on the outside surface thereof and thereafter two bases thereof 33 and 34 are inseparably stuck to the one surface of the ground sheet 21 with the above-mentioned binding agent coated thereon, thus in this manner a plurality of constituent elements are continuously inseparably stuck in parallel at regularly spaced apart intervals for example of about 5 m/m respectively.

One of a plurality of guide means 26 for example is formed as shown in FIGS. 4 and 5, which is provided with two side boards 29 and 30 mounted oppositely slanted relative to each other with a spaced apart interval 27 similar to or a little larger than the width of constituent elements at an open entry side thereof and with a spaced apart interval 28 similar to or a little larger than the thickness of constituent elements folded in two as above mentioned at a narrow exit side thereof, and with a basic board 31 having a gentle gradient on its surface inclined gradually upwardly from a plane to an acute angled peaked shape beneath the two side boards 29 and 30.

Accordingly, as evident in FIG. 4, constituent elements rolled out of said shaft are folded in two back to back while the bases 33 and 34 proceed through the boards 29 and 30 because the boards 29 and 30 have a gradually narrowing spaced interval and the basic board 31 is formed with an acute angled peaked shape, and thereafter the bases 33 and 34 are stuck inseparably to the surface of the ground sheet 21 as above-mentioned.

FIG. 6 is a side view showing a portion of constituent elements thus folded in two back to back in the manner previously described, wherein, however, the string 4 is shown a little more extended than it really is for descriptive purposes.

As apparent in FIG. 6, the lawn-like objects 2 at the constituent elements x are inclined slightly rightwardly in relation with the base 33 molded by said groove 33, while the lawn-like objects 2' at the same elements are inclined slightly leftwardly in a relation to the base 34 molded by said groove 1', whereby when said constituent elements are folded in two back to back so as to appear outwardly as lawn-like objects, they have the exact same outer appearance as natural lawn or the like since the lawn-like objects are randomly disposed, that is, like a random planting.

FIG. 7 is a longitudinal section showing the lawn-like objects in such a state as above mentioned, where the reference character C shows two pieces 2 and 2' different in length thereof, the reference character D shows a piece 3 connected at the tips of two pieces 2 and 2' having nearly equal sizes in length and diameter, and reference character E shows a piece connected with a larger one in length and diameter and a smaller one in length and diameter at an almost middle portion of the former as indicated by reference numeral 3 (wherein the bases 33 and 34 are not shown).

Further, the above-mentioned constituent elements x is inseparably stuck to one surface of the ground sheet 21 by means of the tension applied on the linear base portions 33 and 34 between the shaft 23 and 37.

In this case, a stronger tension can be applied on the bases 33 and 34 wherein the string 4 is embedded as shown in FIG. 6, whereby the constituent element can easily be stuck to the ground sheet with regularly spaced apart intervals, and at this time they are heated with the cylindric heater at the temperature of about 220°C to permit the pasty binding agent to be gelatinized, thereby completing the sticking process. After this sticking process the product M is conveyed through a cooling device provided forwardly of the shaft 23 to be completely cooled by cooling air from said device, and is thereafter rolled up by the winder shaft 23.

The products M' is explained in following description, then further improved from said products M.

The products M rolled up by the winding shaft 23 are conveyed, while being rolled out, with their patterned surface facing upwardly through the peripheral surface of a support roller 40 in the direction of the arrow in FIG. 8. A rotatable roller 42 with for example a card clothing 41 covering the peripheral surface thereof mounted on the outer peripheral surface of said rotatable roller 40 is rolled over the products M for carding the lawn-like objects 2 and 2' connected at a tip or middle portion thereof as previously described, to be individually separated, and thereafter the finished products M' are again rolled up by another winder. In the case of sticking the constituent elements x to the ground sheet 21, the mutually connected pieces 2 and 2' of the lawn-like objects are heated at about 220°C and cooled to be hardened and thereby kept in an arched shape.

Consequently, the product M' having arched lawn-like objects is obtained with carding to cut the connected portions thereof.

In the present invention, the products are provided with the lawn-like objects having the appearance of being planted on the ground sheet in various directions inclined longitudinally rightwardly or leftwardly and bent with an arched shape because of the slightly rightwardly or leftwardly inclined patterns engraved in the cylindric metallic plate with carding of the constituent elements to cut the connected portions of the lawn-like objects thereof as afore-mentioned. The artificial lawn-like objects obtained in accordance with the method of this invention are quite different from the conventional ones in that they are exactly the same as natural lawn or other similar grass in respect to configuration, outer appearance, dimentions, colors and the like.

While the foregoing is concerned with the method of producing the artificial lawn-like objects by means of a rotating cylindric metallic plate with a surface engraved with a lawn-like design, the same methods are applicable to the production of carpets and hi-piles and other kinds of matting as unobtainable with the conventional methods.

Additionally, as evident in the above description, the simple method of this invention enables mass production resulting in superior quality and low cost.

It is to be understood that the present invention is not altogether limited to the particular embodiments described herein but includes such changes and modification thereof as fall within the scope and spirit of the appended claims.

What I claim is:

1. A method for producing artificial grass articles comprising the steps of:
    a. forming a molding plate with a mold cavity shaped to have formed therein molded articles including blade portions simulating blades of grass, said molded articles being formed with a pair of spaced apart elongated parallel base members extending on opposite sides thereof each having said blade portions integrally formed therewith and extending therefrom toward each other in opposed directions, each of said blade portions having a length which is less than the distance between said base members, with selected ones only of said blade portions extending from opposite base portions being joined together, said blade portions being formed in a configuration inclined relative to said base members longitudinally thereof;
    b. placing string within said mold cavity to extend along portions thereof wherein said base members are formed;
    c. filling said mold cavity with synthetic resin paste;
    d. hardening said paste within said mold cavity by applying heat thereto thereby to form said molded articles;
    e. removing said molded articles from said molding plate and winding said formed molded articles upon a first roller;
    f. providing a base sheet wound on a second roller and coating said base sheet on one side thereof with a synthetic resin adhesive while unwinding said base sheet from said second roller;
    g. providing a rotating heating cylinder and passing said base sheet in the direction of rotation of said heating cylinder over the outer peripheral surface thereof so as to dispose said adhesively coated side of said base sheet opposite to said peripheral surface;
    h. providing guide means consisting of a pair of side boards and a base, said side boards being juxtaposed to extend in converging directions relative to each other to form a tapering passage therebetween having a wider entrance end and a narrower exit end, said base being connected with said side boards within said passage and having a graded peaked configuration extending in an acute angle from said entrance end to said exit end;
    i. unwinding said molded articles from said first roller;
    j. folding said molded articles by passing them through said guide means, said molded articles being folded with said base members overlapping and with said blade portions extending from each of said base members on the same side thereof;
    k. passing said base members over said heating cylinder in abutment with said adhesively coated side of said base sheet; and
    l. adhering said base members to said base sheet by application of heat from said heating cylinder to harden said adhesive to produce said artificial grass articles with said blade portions extending on one side of said base sheet.

2. A method according to claim 1 including the further steps of:
    m. winding upon a third roller said artificial grass articles after adhesion of said base members to said base sheet;
    n. arranging carding roller means having card clothing on the outer periphery thereof adjacent a support roller having a diameter larger than said carding roller means; and
    o. severing said joined together blade portions by passing said artificial grass articles between said carding roller means and support roller with said blade portions facing toward said carding roller means whereby said blade portions may be carded by said carding roller means.

* * * * *